Patented Oct. 25, 1938

2,134,234

UNITED STATES PATENT OFFICE 2,134,234

INDEXING MECHANISM

Arthur Hitchcock Orcutt and Richard John Bullows, Birmingham, England, assignors to The Gear Grinding Company Limited, Birmingham, England Application November 8, 1937, Serial No. 173,537
In Great Britain December 5, 1936

4 Claims. (Cl. 51—216)

This invention has for its object to provide an improved indexing mechanism adapted for use more particularly on gear grinding machines but applicable also to other analogous machines in which it is required to impart intermittent angular movements to a work piece for presenting different aspects of the latter to a grinding or cutting tool.

The invention comprises the combination of an indexing plate provided with teeth or notches, an oscillatory actuating pawl adapted by engagement with the teeth or notches to impart intermittent and unidirectional angular movements to the plate, a positioning pawl adapted by co-operation with the teeth or notches of the plate to determine its stationary positions, a friction brake acting in opposition to the movements of the plate, and resilient means for opposing rotation of the brake, the arrangement being such that during each angular movement of the plate under the action of the actuating pawl energy is stored in the said resilient means, and at the completion of each such movement of the plate (which is slightly in excess of the movement required) the said energy is utilized to impart a small but sufficient return movement to the plate to bring a face of the appropriate tooth or notch into abutment with the positioning pawl.

In the accompanying sheets of explanatory drawings:—

Figure 1:
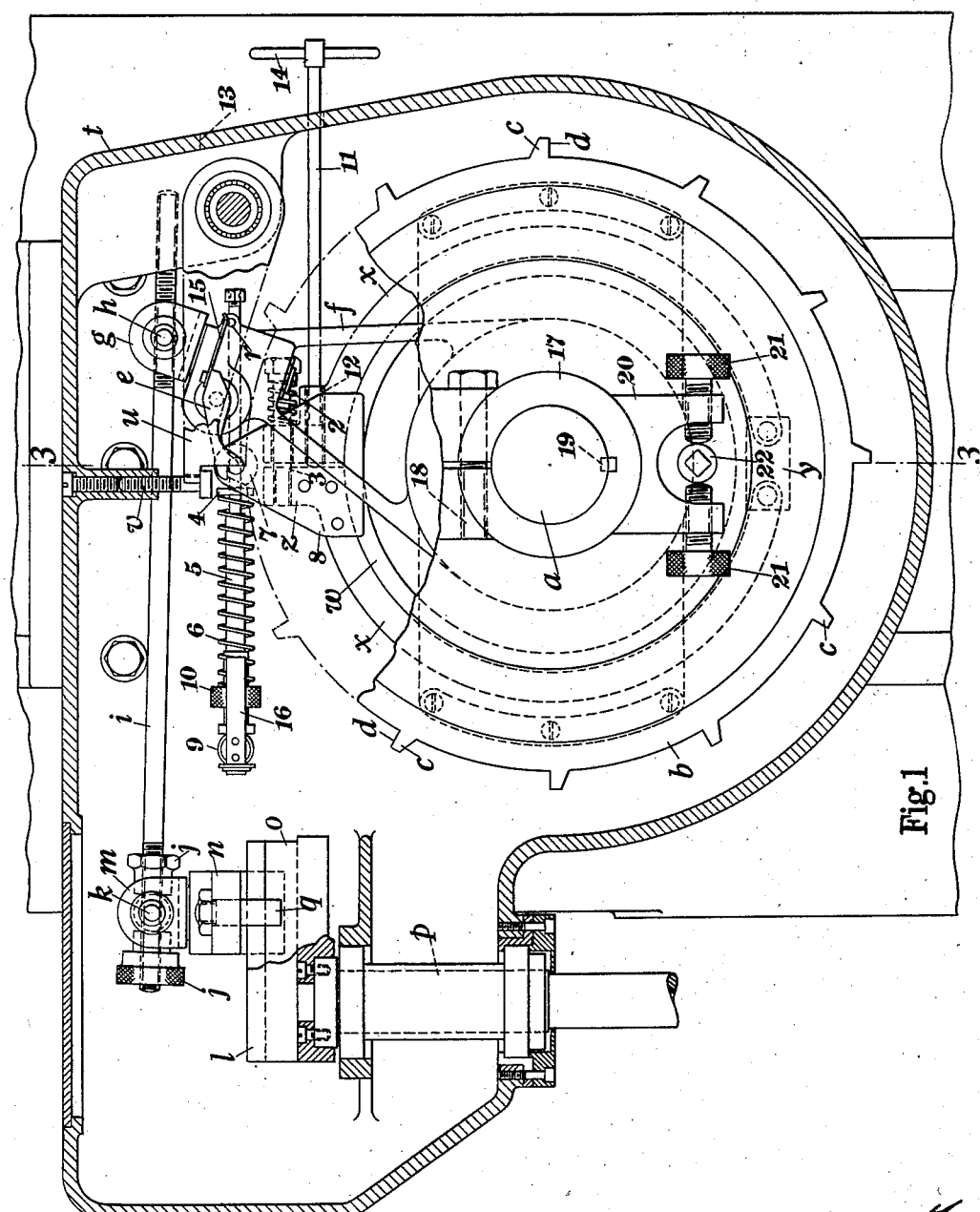
Figures 1 and 2 are respectively a part sectional front elevation and a part sectional plan of indexing mechanism constructed in accordance with the invention for a gear grinding or other machine.
Figure 2:
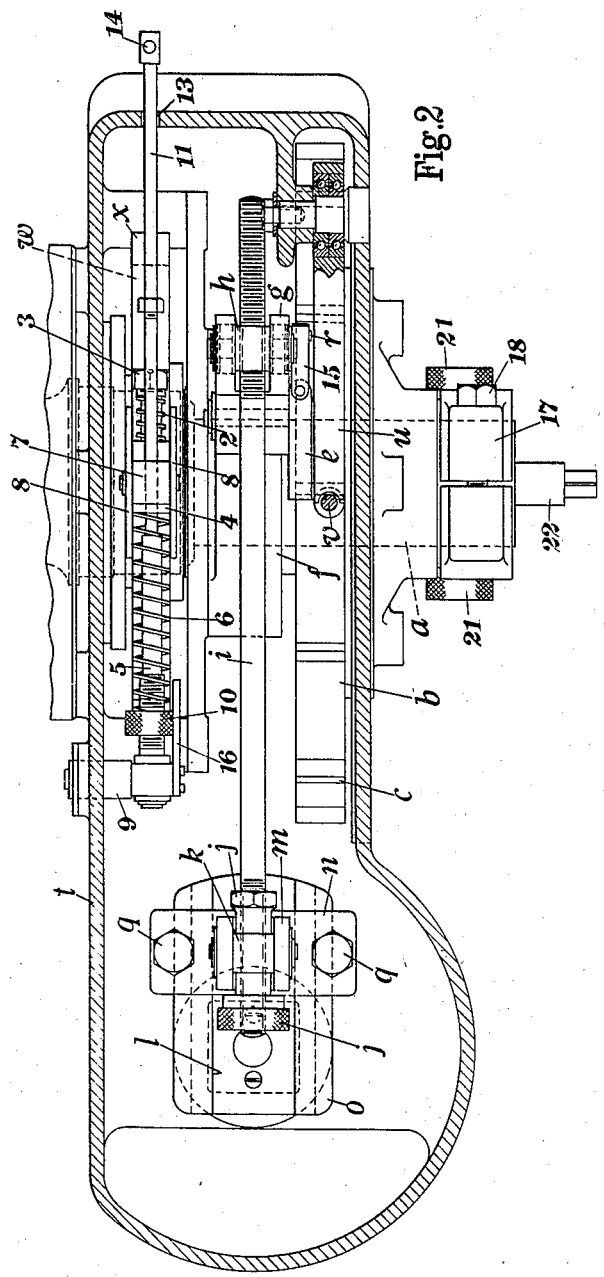
Figure 3:
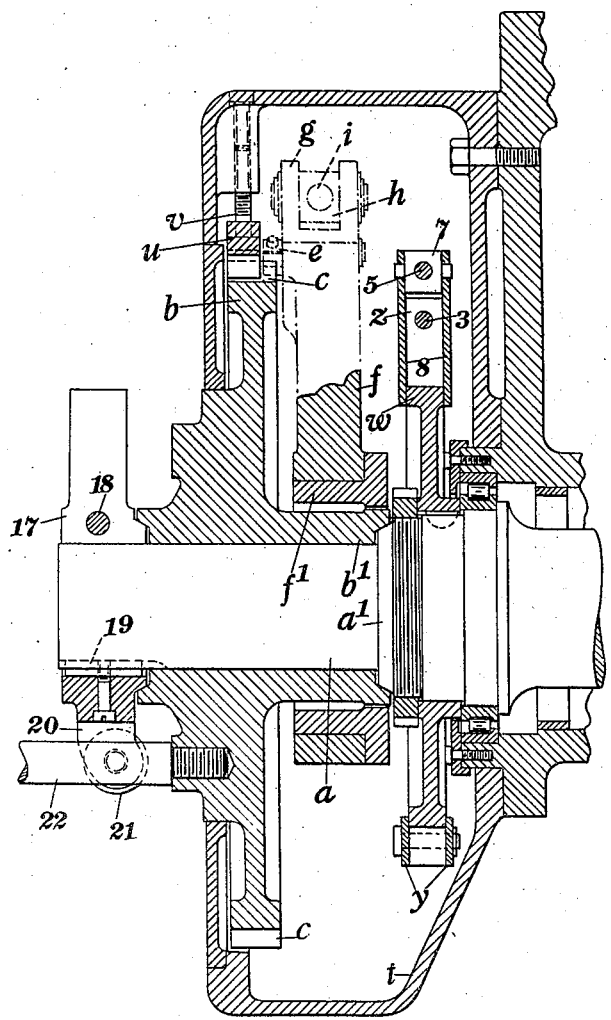
Figure 3 is a section on the line 3—3 of Figure 1.

In carrying the invention into effect as shown, we mount on the work-spindle $a$ an indexing plate $b$ having its periphery formed with suitably spaced teeth $c$ each having a radial face $d$, the spacing of the teeth $c$ corresponding to the intermittent and unidirectional angular movements required to be given to the plate $b$ and work-spindle $a$ for indexing the work piece (not shown). The plate $b$ is actuated by a pawl $e$ carried on an oscillatory arm $f$ adapted to be oscillated about an axis coaxial with that of the plate $b$ by any convenient crank or other mechanism which is appropriately co-ordinated with the other movements of the machine. In the example shown, the arm $f$ is mounted on a sleeve $f^1$ surrounding a boss $b^1$ on the plate $b$. Also the outer end of the arm $f$ carries a pivotal bearing $g$ in which is journalled a member $h$ having a transverse screw threaded bore through which passes a complementary screw threaded end of a horizontal reciprocatory rod $i$. The other end of the rod $i$ is also screw threaded and carries a pair of nuts $j$. Further the latter end of the rod $i$ passes freely through a transverse bore in a member $k$, and the nuts $j$ adjustably secure the rod to this member by acting on opposite sides of the latter. The member $k$ is journalled in a pivotal bearing $m$ carried by a member $n$ which is adapted to transmit reciprocatory movements to the rod $i$ from a crank $o$ on a shaft $p$ driven from any convenient part of the machine. The member $n$ serves as a crank pin and is adjustably secured by bolts $q$ in a slot $l$ formed longitudinally in the crank $o$. By appropriately adjusting the position of the member $n$ on the crank $o$, the amplitude of the movements imparted to the rod $i$ by the member $n$ and, consequently, to the arm $f$ by the rod $i$, can be varied as required. The pawl $e$ is pivoted on the arm $f$ adjacent to the outer end of the latter, and is controlled by a spring 15 in the form of a strip attached at one end to the rear end of the pawl, the other end of the strip being arranged to abut against a peg $r$ on the arm $f$. The pawl $e$ is adapted to abut against the radial face $d$ of each tooth $c$ in succession, and the amount of angular movement given to the plate $b$ by the pawl in each operative movement of the arm $f$ is slightly in excess of the motion actually required. Adjacent to the actuating pawl $e$ there is pivoted on any convenient stationary part, such as, the casing $t$ of the mechanism, a positioning pawl $u$ the free end of which is also adapted to abut against the radial face $d$ of each tooth $c$ in turn. The positioning pawl $u$ falls into position by its own weight, or it may be aided by a spring, the operative position of this pawl being determined by an adjustable abutment in the form of a screw $v$ secured to the casing $t$, the outer end of the pawl $u$ being adapted to abut against the head of the screw $v$ as shown. While the plate $b$ is being moved relatively to the positioning pawl $u$ the latter rides idly over the rear face of each tooth $c$, which face may be of any convenient inclined or other shape.

On the work-spindle $a$ is arranged a brake drum $w$, and this is embraced by a pair of brake shoes $x$ arranged at opposite sides of the drum. At one pair of adjacent ends the brake shoes $x$ are pivoted to and interconnected by attachment pieces $y$, and at the other pair of adjacent ends the brake shoes are formed or provided with lugs $z$. These lugs are spaced apart and urged towards each other by a spring 2 on a screw 3 which is in screw threaded engagement with one of the lugs and passes freely through an aperture in the other lug, the spring 2 being adapted to abut at opposite ends respectively against the outer side of the latter lug and the head of the screw 3. By urging the lugs z towards each other the spring 2 causes the shoes to grip the brake drum $w$. For enabling the brake shoes $x$ to oppose rotation of the plate $b$, rotation of the shoes is opposed by a spring supported stop. In the example shown, this stop has the form of a collar 4 slidably mounted on a rod 5 and adapted to abut, under the action of a spring 6, against an abutment piece 7 which is journalled in a bracket 8 secured to one of the lugs $z$. The rod 5 is supported at one end by a bearing member 9 extending from the casing $t$, and the portion of the rod remote from this end is reduced. This reduced portion of the rod 5 carries the collar 4 and passes freely through a transverse hole in the abutment piece 7, the spring 6 being arranged on the rod between the collar and a nut 10 in screw thread engagement with the rod. By adjusting the nut 10 the pressure exerted by the spring 6 on the collar 4 can be varied as required. A plate 16 detachably secured to the bearing 9 co-acts with a flat face of the nut 10 to retain the latter in its adjusted position.

During each angular movement of the plate $b$ under the action of the pawl $e$ and against the action of the brake shoes $x$, these shoes (because they tend to rotate with the drum $w$) compress the spring 6 by the co-operation of the abutment piece 7 and collar 4, and thereby cause energy to be stored in the spring 6. After the actuating pawl $e$ has ceased to exert its effort on the plate $b$, and during the initial part of the return movement of this pawl, the spring 6 by its action on the abutment piece 7 imparts a small return movement to the plate $b$, thereby bringing the radial face $d$ of the operative tooth $c$ gently into contact with the end of the positioning pawl $u$ for accurately determining the stationary position of the plate $b$.

For enabling the plate $b$ to be adjusted angularly on the work-spindle $a$ we arrange the plate so that opposite ends of its boss $b^1$ abut respectively against a shoulder $a^1$ on the spindle and a retaining member 17 detachably secured on the end of the spindle by a clamping screw 18 passing through a split portion of the retaining member. A key 19 prevents rotation of the retaining member 17 relatively to the spindle $a$, but permits this member to be removed from the spindle when the clamping screw 18 is released. Formed on the retaining member 17 is a bifurcated part 20 which carries adjusting screws 21 adapted to act on opposite sides of a rod 22 extending from the adjacent side of the plate $b$. By appropriately manipulating the screws 21 the angular position of the plate $b$ on the spindle $a$ can be varied as required.

For separating the brake shoes $x$ to permit free rotation of the spindle $a$ and plate $b$ during testing and like operations, a rod 11 is adapted at its inner end to be screwed through a bore 12 in one of the lugs $z$, and to exert pressure against the adjacent side of the other of these lugs, the outer end of this rod, which extends through an opening 13 in the casing $t$ being provided with an operating handle 14.

The invention is especially suited for indexing mechanisms used with heavy work pieces where inertia effects are likely to be large, and by the invention we are able to effect rapid indexing of such work pieces without shock in a very simple and convenient manner.

The invention is not limited to the example described, as subordinate mechanical details may be varied to suit different requirements. Thus, instead of providing teeth on the periphery of the indexing plate, this plate may be formed with peripheral notches for co-operating with the pawls, and preferably one face of each notch is radial to the axis of the plate.

Having thus described our invention what we claim as new and desire to secure by Letters Patent is:—

1. Indexing mechanism for machine tools, comprising the combination of a rotatable indexing plate provided with abutment surfaces, an oscillatory actuating pawl adapted by engagement with said abutment surfaces to impart intermittent and unidirectional angular movements to said plate, a positioning pawl adapted by co-operation with said abutment surfaces to determine the stationary positions of said plate, a friction brake having interacting parts formed by a member rigid with said plate and gripping means carried by said member, and resilient means co-operating with said gripping means so that, during each of the angular movements imparted to said plate by said actuating pawl, said resilient means acquires energy which at the completion of each of said angular movements of the plate is utilized to impart a small but sufficient return movement to said plate through said gripping means to bring the appropriate abutment surface of said plate into contact with said positioning pawl.

2. Indexing mechanism for machine tools, comprising the combination of a rotatable indexing plate provided with abutment surfaces, an actuating pawl adapted by engagement with said abutment surfaces to impart intermittent and unidirectional angular movements to said plate, an arm carrying said actuating pawl and adapted to be oscillated about an axis co-axial with that of said plate, a positioning pawl adapted by co-operation with said abutment surfaces to determine the stationary positions of said plate, a brake drum coaxial and rigid with said plate, gripping means carried by and co-operating with said brake drum, and a spring-supported stop co-operating with the said gripping means so that, during each of the angular movements imparted to said plate by said actuating pawl, said resilient means acquires energy which at the completion of each of said angular movements of the plate is utilized to impart a small but sufficient return movement to said plate through said gripping means to bring the appropriate abutment surface of said plate into contact with said positioning pawl.

3. Indexing mechanism for machine tools, comprising the combination of a rotatable indexing plate provided with abutment surfaces, an oscillatory actuating pawl adapted by engagement with said abutment surfaces to impart intermittent and unidirectional angular movements to said plate, a positioning pawl adapted by co-operation with said abutment surfaces to determine the stationary positions of said plate, a brake drum coaxial and rigid with said plate, a pair of interconnected brake shoes carried by and embracing opposite sides respectively of said drum, resilient means urging said brake shoes into contact with said drum, and a spring-supported stop co-operating with one of said brake shoes so that, during each of the angular movements imparted to said plate by said actuating pawl, said stop acquires energy which at the completion of each of said angular movements is utilized to impart a small but sufficient return movement to said plate through said gripping means to bring the appropriate abutment surface of said plate into contact with said positioning pawl.

4. Indexing mechanism as claimed in claim 3, in which the spring-supported stop comprises the combination of a rod, a collar slidably mounted on said rod and adapted to co-act with one of the brake shoes, a spring mounted on said rod and abutting at one end against said collar, and an adjustable nut in screw thread engagement with said rod and adapted to act on the oposite end of said spring for regulating the pressure exerted by the latter on said collar.

ARTHUR HITCHCOCK ORCUTT.
RICHARD JOHN BULLOWS.